Jan. 24, 1928.

C. SONCINI 1,656,960

DEVICE FOR LUBRICATING AUTOMATIC FIREARMS

Filed June 17, 1926

Inventor:
Cesare Soncini
By
Attorney

Patented Jan. 24, 1928.

1,656,960

UNITED STATES PATENT OFFICE.

CESARE SONCINI, OF BRESCIA, ITALY, ASSIGNOR TO SOCIETA ITALIANA ERNESTO BREDA, OF MILAN, ITALY, A JOINT-STOCK COMPANY.

DEVICE FOR LUBRICATING AUTOMATIC FIREARMS.

Application filed June 17, 1926, Serial No. 116,658, and in Italy June 17, 1925.

The lubrication of automatic fire arms is usually effected at the present time by forced circulation, using small pumps of various design, operated by the moving parts of the weapon. Devices of this kind have many draw-backs of different natures, due to the delicate parts and delicate operation of the pumps, which are difficult to get at, irregular in their operation when the density of the lubricating oil varies and require a certain power for securing proper operation. All such drawbacks increase the chances of the weapon sticking and the difficulties and length of the inspection that may be required even during action.

The object of the present invention is to provide a lubricating system for automatic fire-arms, based on the use of a reservoir or box from which the lubricant flows by gravity, under the effect of the vibrations incidental to firing, through passages whose inlet can be varied by a regulating element which is accessible from the outside, means being provided for locking such element in the position desired.

Figure 1:
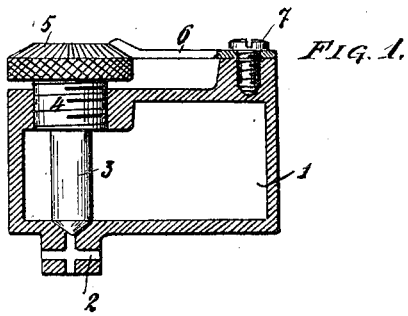
Figure 2:
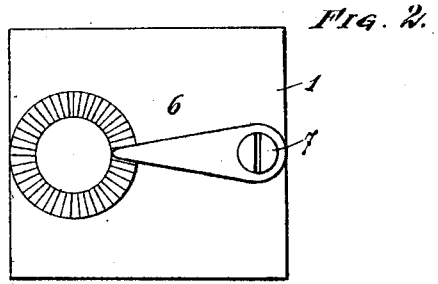
Figure 3:
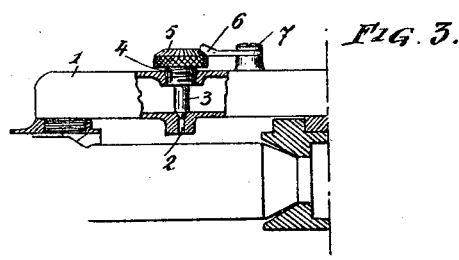

The accompanying drawing shows by way of illustration one embodiment of the present invention, in which:

Fig. 1 is a cross-section of the invention;
Fig. 2 a plan;
Fig. 3 is a part-sectional side view showing the invention applied to the lubrication of the block-guides.

A box or reservoir 1, of any convenient form and equipped with suitable fastening means, has a system of intersecting outlet passages or apertures 2 which lead to the outside of the box and are disposed in the most convenient way according to the object to be obtained. The flow of lubricant from the inside of the box through these passages is controlled by a needle valve 3 according to requirements.

To this end, the stem of the valve is formed with a threaded portion 4 and has a milled head 5 by which it can be screwed or unscrewed from the outside of the box thus varying the distance of its pointed lower end from its seat in the outlet; the said valve being also used as a stopper for the box 1. In order to prevent the shocks from loosening the screw 3, a spring detent 6 fixed by screw 7 to the box, engages in notches cut in the head 5, locking it in any required position.

The shape of the box, the means for securing it to the weapon, the character and position of the outlet apertures or passages, and the form of the needle valve and of the locking elements may vary without exceeding the compass of the present invention.

Having thus described my invention, what I claim as new and desire to secure by Letters Patent is:

1. A device for lubricating automatic firearms, comprising a lubricant reservoir adapted to be secured upon the fire-arm in position to be subjected to the shocks incidental to firing, and also having at its bottom at least one fine outlet aperture through which the lubricant is discharged exclusively by such shocks acting to overcome the adhesion of the lubricant to the wall of the aperture; a needle valve for controlling said aperture in accordance with the speed of firing adjustably mounted in said reservoir and having an upper operating portion which is disposed exteriorly of the reservoir; and means for retaining said valve in adjusted position.

2. A device for lubricating automatic firearms, comprising a lubricant reservoir adapted to be secured upon the fire-arm in position to be subjected to the shocks incidental to firing, and also having at its bottom at least one fine outlet aperture through which the lubricant is exclusively discharged by such shocks acting to overcome the adhesion of the lubricant to the wall of the aperture; a needle valve for controlling said aperture in accordance with the speed of firing adjustably mounted in said reservoir and having a notched operating head which is disposed exteriorly of the reservoir; and a spring detent secured upon the top of the reservoir and engaging the notches in said head to hold the valve in adjusted position.

In testimony whereof I affix my signature.

CESARE SONCINI.